(12) United States Patent
Grissino et al.

(10) Patent No.: US 10,450,954 B2
(45) Date of Patent: Oct. 22, 2019

(54) INTERNALLY HEATED ENGINE INLET SCREEN FOR AIRCRAFT ENGINES

(71) Applicant: General Electric Company, Schenectady, NY (US)

(72) Inventors: Alan Scott Grissino, Amesbury, MA (US); John Alan Manteiga, North Andover, MA (US); Jonathan Harry Kerner, Brookline, MA (US)

(73) Assignee: General Electric Company, Schenectady, NY (US)

( * ) Notice: Subject to any disclaimer, the term of this patent is extended or adjusted under 35 U.S.C. 154(b) by 797 days.

(21) Appl. No.: 15/072,662

(22) Filed: Mar. 17, 2016

(65) Prior Publication Data

US 2017/0268424 A1 Sep. 21, 2017

(51) Int. Cl.
*F02C 7/047* (2006.01)
*B64D 15/04* (2006.01)
(Continued)

(52) U.S. Cl.
CPC .............. *F02C 7/047* (2013.01); *B64D 15/04* (2013.01); *B64D 33/02* (2013.01); *F02C 6/08* (2013.01); *F02C 7/05* (2013.01); *F02C 7/055* (2013.01); *F04D 29/522* (2013.01); *B64D 2033/022* (2013.01); *B64D 2033/0233* (2013.01);
(Continued)

(58) Field of Classification Search
CPC . F02C 7/047; F02C 7/05; F02C 7/055; B64D 2033/0233; B64D 2033/022; B64D 33/03; B64D 15/02; B64D 15/06; B64D 2045/009; B64D 2045/0095

See application file for complete search history.

(56) References Cited

U.S. PATENT DOCUMENTS 2,663,993 A 12/1953 Mosser
2,680,345 A 6/1954 Frost
(Continued)

FOREIGN PATENT DOCUMENTS

JP 2007-010183 A 1/2007
JP 2011-026708 A 2/2011

OTHER PUBLICATIONS

Office Action issued in connection with corresponding CA Application No. 2959692 dated Feb. 26, 2018.
(Continued)

*Primary Examiner* — Jason D Shanske
*Assistant Examiner* — Danielle M. Christensen
(74) *Attorney, Agent, or Firm* — General Electric; James Reed

(57) ABSTRACT

An apparatus for providing foreign object debris protection and anti-icing capabilities to an air intake of an aircraft engine. The apparatus includes a frame having at least a portion configured to conduct fluids. A tube is positioned such that different portions of the frame are fluidly connected. There is a discharge outlet defined within the frame that is configured to discharge fluids from the frame into the air intake. An inlet is defined within the frame and is fluidly connected to a compressor section of the aircraft engine. In this manner, air from the compressor section of the aircraft engine can flow through the inlet, through the tube, and through the discharge outlet, to return to the compressor section of the aircraft engine.

16 Claims, 5 Drawing Sheets

(51) Int. Cl.
*B64D 33/02* (2006.01)
*F02C 7/05* (2006.01)
*F04D 29/52* (2006.01)
*F02C 6/08* (2006.01)
*F02C 7/055* (2006.01)

(52) U.S. Cl.
CPC ........ *B64D 2033/0246* (2013.01); *B64D 2033/0293* (2013.01); *F05D 2220/32* (2013.01); *F05D 2240/129* (2013.01); *F05D 2270/11* (2013.01); *Y02T 50/671* (2013.01)

(56) References Cited

U.S. PATENT DOCUMENTS

| | | | |
|---|---|---|---|
| 2,764,390 | A | 9/1956 | Harris, Jr. |
| 3,421,296 | A * | 1/1969 | Beurer, Sr. ............ B64D 33/02 209/710 |
| 3,925,979 | A | 12/1975 | Ziegler |
| 3,981,466 | A | 9/1976 | Shah |
| 4,328,666 | A | 5/1982 | Cummins, Jr. |
| 4,760,978 | A | 8/1988 | Schuyler et al. |
| 5,560,195 | A | 10/1996 | Anderson et al. |
| 6,027,304 | A | 2/2000 | Arar et al. |
| 6,685,425 | B2 | 2/2004 | Poccia et al. |
| 7,811,050 | B2 | 10/2010 | Roth |
| 8,844,258 | B2 | 9/2014 | Ekanayake et al. |
| 9,067,679 | B2 | 6/2015 | Scimone |
| 2002/0179773 | A1 | 12/2002 | Breer et al. |
| 2008/0307769 | A1 | 12/2008 | Chaney et al. |
| 2009/0241552 | A1 | 10/2009 | Vega et al. |

OTHER PUBLICATIONS

Machine translation and Notification of Reasons for Refusal issued in connection with corresponding JP Application No. 2017-042310 dated Mar. 20, 2018.
Extended European Search Report and Opinion issued in connection with corresponding EP Application No. 17160426.7 dated Jul. 28, 2017.
Machine Translation and First Office Action and Search issued in connection with corresponding CN Application No. 201710160376.2 dated Jul. 30, 2018.
Office Action issued in connection with corresponding CA Application No. 2959692 dated Oct. 19, 2018.

* cited by examiner

INTERNALLY HEATED ENGINE INLET SCREEN FOR AIRCRAFT ENGINES

BACKGROUND OF THE INVENTION

The present invention relates to aircraft engine deicing and icing prevention and more specifically to an apparatus for the prevention of ice build-up on inlet foreign object debris (FOD) screens through internal hot air heating.

Aircraft and aircraft engine icing is a persistent issue that must be dealt with in most aircraft applications. Prevention of ice build-up on inlet screens for the prevention of foreign object debris ("FOD") is necessary for protection from shedding damage, inlet airflow distortion, and inlet airflow blockage. Conventional methods of heating inlet FOD screens for anti-icing in deicing do not provide thermal energy from the engine compression system directly to the screen. Instead such conventional systems utilize an external source such as an off-engine hot air or engine/aircraft electrical power.

BRIEF DESCRIPTION OF THE INVENTION

This need is addressed by an apparatus for distributing existing thermal energy from the engine compression system to each inlet screen, and more specifically, to each wire or bar component within each mesh screen.

According to one aspect of the present invention there is provided an apparatus for providing foreign object debris protection and anti-icing capabilities to an air intake of an aircraft engine. The apparatus includes a frame having at least a portion configured to conduct fluids. A tube is positioned such that different portions of the frame are fluidly connected through the tube. There is a discharge outlet defined within the frame that is configured to discharge fluids from the frame into the air intake. An inlet is defined within the frame and is fluidly connected to a compressor section of the aircraft engine. In this manner, air from the compressor section of the aircraft engine can flow through the inlet, through the tube, and through the discharge outlet, to return to the compressor section of the aircraft engine.

According to another aspect of the present invention there is provided a method for providing anti-icing capabilities to the air intake of an aircraft engine wherein the aircraft intake is covered by mesh having at least a portion thereof configured to conduct fluids. The method includes the steps of: conducting heated air from a compressor section of the aircraft engine; conducting the heated air through the portion of mesh configured to conduct fluids; conducting heat through the mesh; elevating the temperature of the mesh; and returning the air to the compressor section of the aircraft engine.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
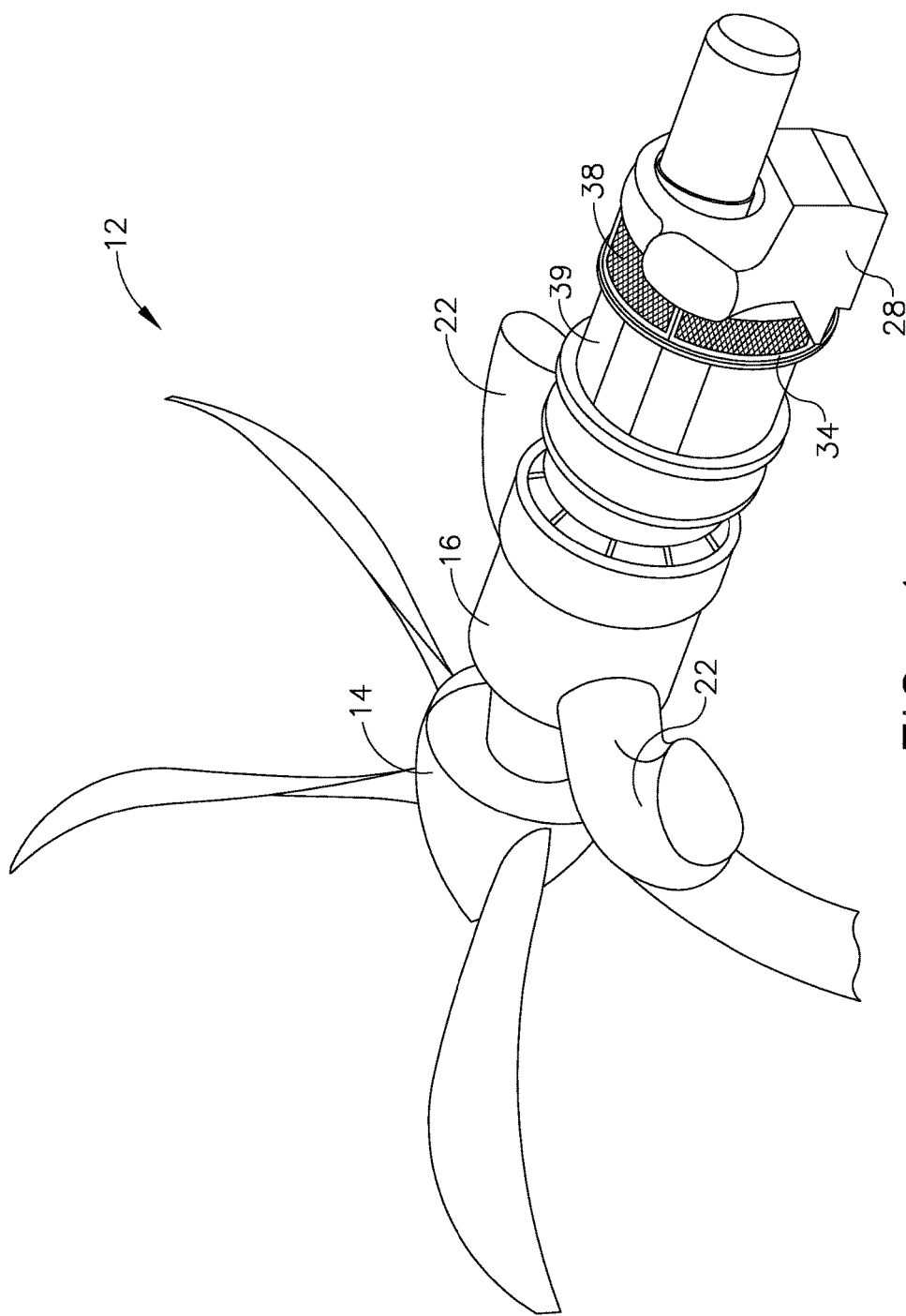
FIG. 1 shows a perspective view of an aircraft engine that includes a plurality of FOD screens according to the present invention.

Referring to the drawings wherein identical reference numerals denote the same elements throughout the various views, FIG. 1 shows an engine 12 that includes at least one screen 50 arranged in a screen assembly 38 such that the plurality of screens 50 each cover an air intake inlet 34. The screens 50 each include at least a portion that is heated with air that comes from the compressor section of the engine 12. The engine 12 also includes a propeller assembly 14, a pair of exhausts 22, and a mounting block 28. In the illustrated embodiment the engine 12 is a turboprop aircraft engine. In other embodiments the engine 12 could be configured for use in marine and industrial applications.

Figure 2:
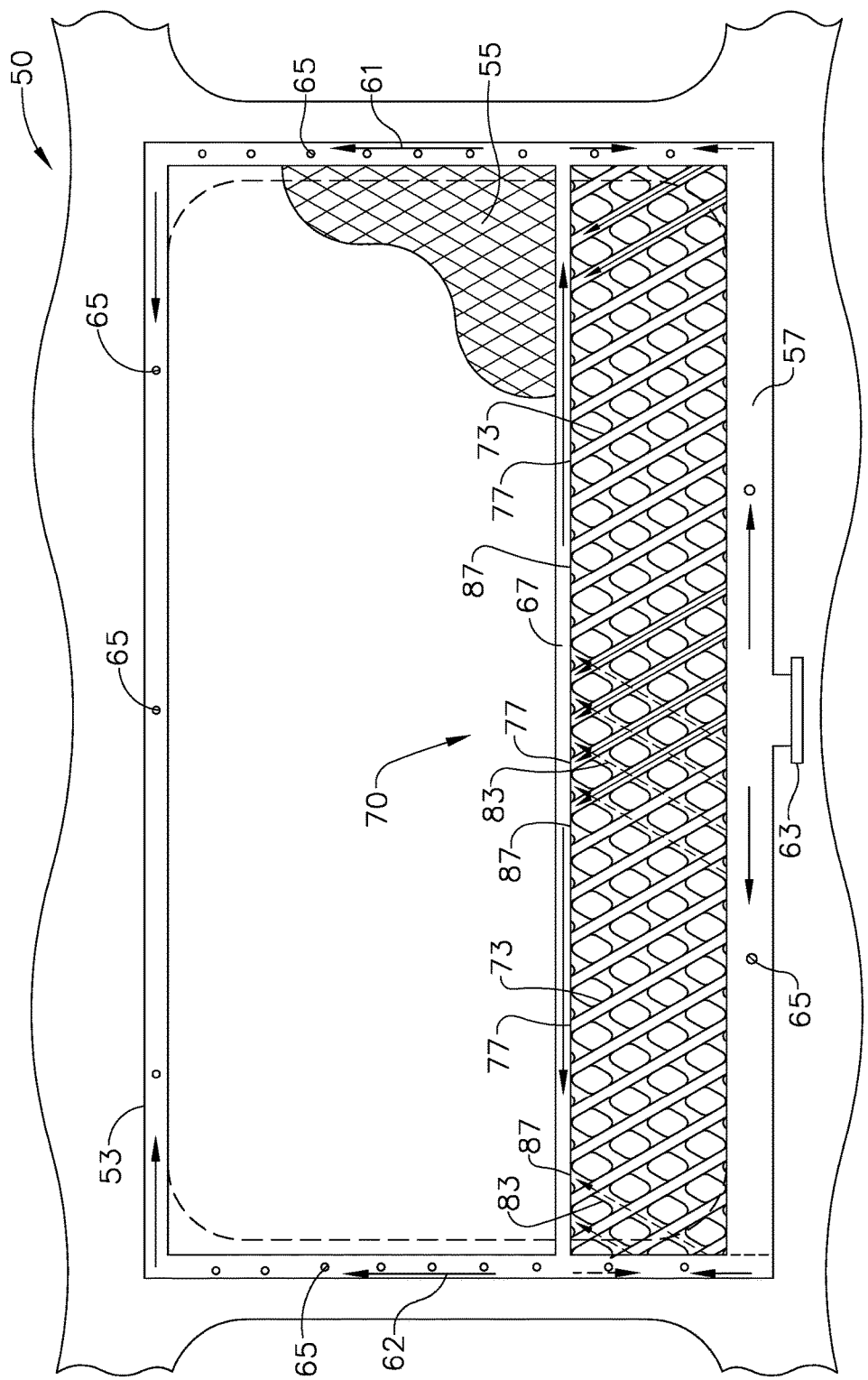
FIG. 2 shows a plan partially cutaway view of a screen according to the present invention.

Referring now to FIG. 2, a section of the screen assembly 38 is shown such that an exemplar screen 50 is presented in plan view with sections cutaway. The screen 50 includes a frame 53 configured to support unheated mesh 55 and a heated mesh assembly 70. In the illustrated embodiment, the frame 53 is of tubular construction and includes a header 57, a first side duct 61, a second side duct 62, an intermediate duct 67, and a distal duct 58. The intermediate duct 67 stretches between, and fluidly connects, the first side duct 61 and the second side duct 62. The intermediate duct 67, portions of the first side duct 61 and the second side duct 62, and the distal duct 58 are configured to support the unheated mesh 55. The unheated mesh 55 is configured to allow air from the outside of the engine 12 through the air intake inlet 34 and into the air intake duct 32 while preventing foreign object debris (FOD) from entering the air intake duct 32. The header 57, portions of the side duct 61 and the second side duct 62, and the intermediate duct 67 are configured to support the heated mesh assembly 70.

Figure 4:
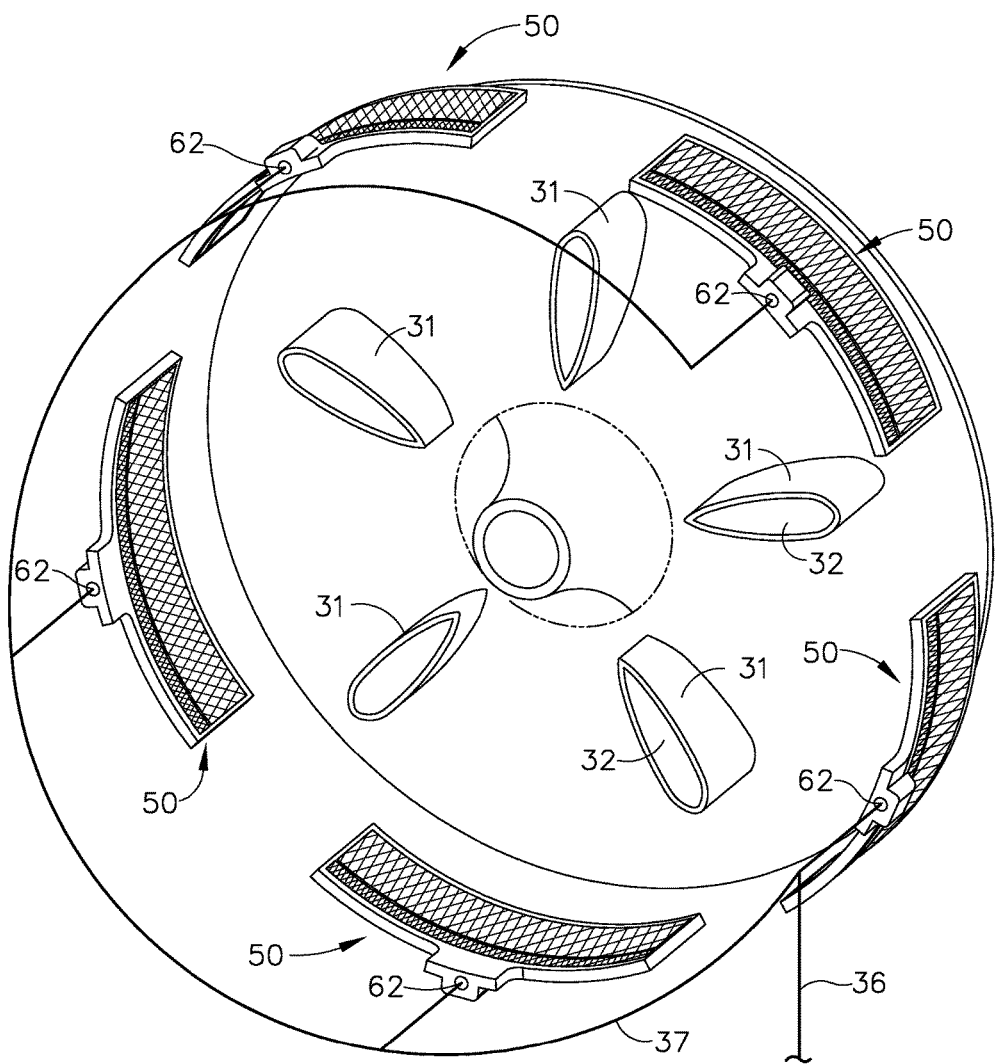
FIG. 4 shows a radially expanded view of a set of screens with sections of an associated engine and a manifold.

As illustrated, the frame 53 is generally comprised of hollow, tubular components. These components are configured to provide passageways for heated air. An inlet 63 is positioned in frame 53 along the header 57. The inlet 63 is configured to be fluidly connected to the bleed line 36 via a manifold 37 as illustrated in FIG. 4. The header 57 is configured to distribute heated air or gas from the compressor section 39 of the engine 12 around the frame 53 such that the frame 53 is heated. A plurality of discharge outlet 65 are formed in the fate frame 53 and release hot air from the frame 53 into the air intake duct 32.

Figure 3:
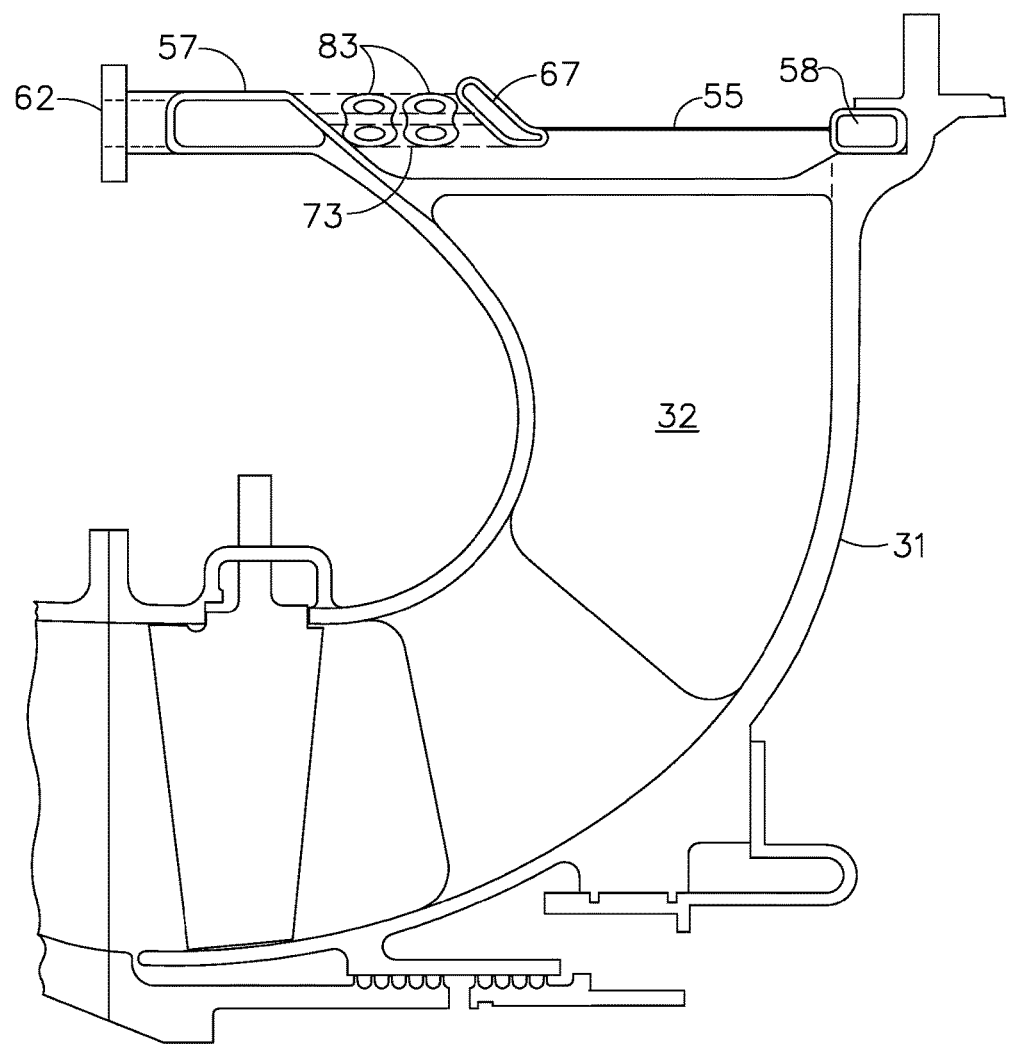
FIG. 3 shows a side cutaway view of the screen and an associated air duct taken along line 3-3 shown in FIG. 2.

Thus the header 57, the first side duct 61, the second side duct 62, and the distal duct 58 together are configured to fluidly connect the inlet 63 to the plurality of discharge outlets 65. The header 57 is also configured to distribute hot air to the heated mesh assembly 70. Referring now to FIGS. 2 and 3, the heated mesh assembly 70 includes a first tier 73 of first tier tubes 74 that is positioned in contact with a second-tier 83 of second-tier tubes 74.

Each first tier tube 74 has a first tier tube entry 75 and a first tier tube exit 77. Each first tier tube 74 defines at least a portion of a pathway that fluidly connects the header 57 to the intermediate duct 67. With regard to the majority of the first tier tubes 74, the entry end 75 is attached to the header 57 and the first tier tube exit end 77 is attached to the intermediate duct 67 for the majority of the first tier tubes 74. As shown in FIG. 2, some of the first tier tubes 74 do not have an entry end 75 connected to the header 57 but instead have the entry end 75 connected to the first side duct 61. In addition, some of the first tier tubes 74 do not have an exit end 77 attached to the intermediate duct 67 but instead have the exit end 77 attached to the second side duct 62.

Likewise, each second-tier tube 84 has a second-tier tube entry 85 and a second tier tube exit 87. Each second tube 84 defines at least a portion of a pathway that fluidly connects the header 57 to one of the first side duct 61 and the second side duct 62. With regard to the majority of the second-tier tubes 84, the entry end 85 is attached to the header 57 and the second tier tube exit end 87 is attached to the intermediate duct 67 for the majority of the second-tier tubes 84. As shown in FIG. 2, some of the second-tier tubes 84 do not have an entry end 85 connected to the header 57 but instead have the entry end 85 connected to the side duct 62. In addition, some of the second-tier tubes 84 do not have an exit end 87 attached to the intermediate duct 67 but instead have the exit end 87 attached to the first side duct 61.

Figures 5, 6:
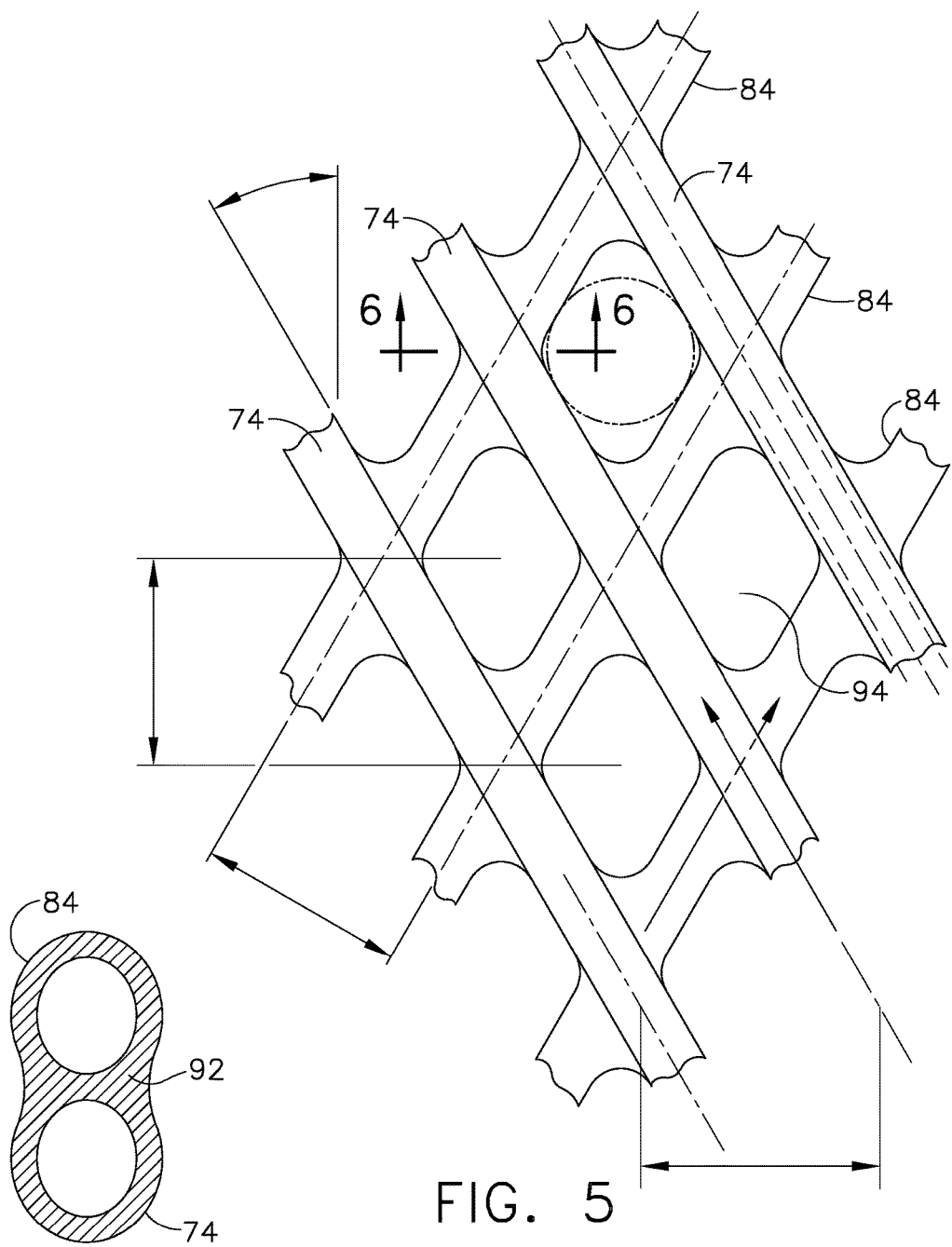
FIG. 5 shows a section of a heated screen.
FIG. 6 shows a section of an intersection of two tubes in a heated screen.

Referring now to FIG. 5 and FIG. 6, the heated mesh assembly 70 and the frame 53 of the screen 50 are formed utilizing advanced manufacturing techniques in a unitary or monolithic piece preferably. The unheated mesh 55 of the screen 50 can be formed together with the other components of the screen 50 as a unitary or monolithic piece. Alternatively, the unheated mesh 55 can be positioned within and attached to the frame 53 which is can figured to receive it after the heated mesh assembly 70 and the frame 53 are formed together as can be seen in the 6, where second-tier tubes 84 cross first tier tubes 74 they share a common wall at intersection 92.

Continuing to refer to FIG. 2 and FIG. 5, a plurality of screen openings 94 are defined by the intersections 92 and portions of the first tier tubes 74 and the second-tier tubes 84. Openings 94 are sized such that FOD above a predetermined size and shape cannot pass through. In addition, the number of openings 94 in each screen 50 is also chosen to allow a predetermined airflow through screen 50. It is believed that the tubular construction of portions of the screen 50 provide additional strength with less weight than similarly sized solid components provide.

Referring now to FIG. 4, which shows the screen assembly 38 in a radially exploded view including partial sections of the struts 31. As shown in the illustrated embodiment, the screen assembly 38 includes a plurality of the screens 50. The screens 50 are radially distributed around the engine 12 and each of the screens 50 are positioned over an air intake inlet 34 of an air intake duct 32. The air intake duct 32 is defined by a strut 31.

As described above, each screen 50 includes an inlet 63. Each of the inlets 63 are fluidly connected to a compressor section 39 of the engine 12 via a manifold 37 and a bleed line 36. It should be appreciated that in other embodiments, each of the inlets 63 can be connected directly to the compressor section 39 of the engine 12 via an individual bleed line. In these embodiments, there is no manifold positioned between the bleed line and the inlet 63.

The present invention can be better understood by a description of the operation thereof. When the engine 12 is operated, heat is generated. Hot air from the compressor section 39 is forced through the bleed line 36 and the manifold 37 to each of the screens 50. At each screen 50, the hot air is conducted through the inlet 63 and along the header 57. It should be appreciated that the screen 50 is configured such that air flowing through pathways defined by the screen 50 such as the header 57 in the heated mesh assembly 70 is distributed in a predetermined manner among the different components. In this regard hot-air is distributed generally throughout the heated mesh assembly 70 and the frame 53. Heat from the air is conducted through the walls of the heated mesh assembly 70 and the frame 53. In this manner, heat from the air derived from the compressor section 39 of the engine 12 heats the surface and surrounding areas of each screen 50 such that ice does not form on the heated mesh assembly providing anti-icing capabilities to each screen 50. Air that is flowing through the screen 50 exits screen 50 through one of the discharge outlet 65. The air is then directed into the air intake duct 32 and back to the compressor section 39.

The present invention has advantages over the prior art. The present invention provides an efficient and cost-effective method for providing engine anti-icing and deicing functionality to an air intake inlet on aviation engines and other products. Unique features of this invention include active prevention of ice accumulation at the air intake inlet combined with FOD protection at the air intake inlet. The present invention provides for utilizing existing thermal energy to provide efficient and cost-effective anti-icing. New engine architectures require more robust is the price prevention at air intake inlets on aviation engines and apparatus of the present invention is robust compared to conventional deicing and FOD prevention and thus able to meet regulation requirements.

The foregoing has described an apparatus and a method for providing anti-icing measures to an air intake inlet on an aviation engine while protecting the inlet from FOD and all of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying potential points of novelty, abstract and drawings), or to any novel one, or any novel combination, of the steps of any method or process so disclosed.

What is claimed is:

1. An apparatus for providing foreign object debris protection and anti-icing capabilities to an air intake of an aircraft engine, the apparatus comprising;
    a frame having at least a portion configured to conduct fluids;
    a plurality of tubes through which different portions of the frame are fluidly connected, wherein the plurality of tubes form a mesh assembly supported by the frame, the mesh assembly having a first tier and a second tier with a first portion of the plurality of tubes being in the first tier and a second portion of the plurality of tubes being in the second tier, the first tier and second tier together defining a mesh of the mesh assembly, the first tier stacked in a direction perpendicular to the flow of fluid traveling through the plurality of tubes on the second tier and in thermal communication with the second tier;

a discharge outlet defined within the frame that is configured to discharge fluid into the air intake;

an inlet defined within the frame; and wherein the inlet is fluidly connected to a compressor section of the aircraft engine such that hot air from the compressor section of the aircraft engine can flow through the inlet, through the plurality of tubes, and through the discharge outlet, to return to the compressor section of the aircraft engine.

2. The apparatus according to claim 1, wherein the frame is also configured to support a mesh that is not configured to be heated.

3. The apparatus according to claim 2, wherein the frame is configured to be heated by hot air from the compressor section around its perimeter.

4. The apparatus according to claim 3, wherein the first portion of the plurality of tubes are arranged in the first tier generally parallel to each other.

5. The apparatus according to claim 4, wherein the second portion of the plurality of tubes are arranged in the second tier generally parallel to each other, the first portion of the plurality of tubes crossing the second portion of the plurality of tubes to form a mesh.

6. The apparatus according to claim 5, wherein the mesh is configured to prevent foreign object debris from entering the air intake of the engine.

7. The apparatus according to claim 1, further including solid wire links positioned in the second tier.

8. A method for providing anti-icing capabilities to the air intake of an aircraft engine wherein the aircraft intake is covered by a mesh assembly supported by a frame and having a plurality of tubes having at least a portion thereof configured to conduct fluids, the mesh assembly having a first tier and a second tier with a first portion of the plurality of tubes being in the first tier and a second portion of the plurality of tubes being in the second tier in thermal communication with the first portion of the plurality of tubes in the first tier, the first tier and second tier together defining a mesh of the mesh assembly with the first tier stacked in a direction perpendicular to the flow of fluid traveling through the plurality of tubes on the second tier, the method comprising the steps of:

conducting heated air from a compressor section of the aircraft engine;

conducting the heated air through the portion of mesh configured to conduct fluids;

conducting heat through the mesh;

elevating the temperature of the mesh; and returning the air to the compressor section of the aircraft engine.

9. The apparatus according to claim 8, wherein the frame is configured to be heated by hot air from the compressor section around its perimeter.

10. The apparatus according to claim 9, wherein the first portion of the plurality of tubes are arranged in the first tier generally parallel to each other and the second portion of the plurality of tubes are arranged in the second tier generally parallel to each other, the first portion of the plurality of tubes crossing the second portion of the plurality of tubes to form the mesh.

11. The apparatus according to claim 10, wherein the mesh is configured to prevent foreign object debris from entering the air intake of the engine.

12. The apparatus according to claim 8, further including solid wire links positioned in the second tier.

13. An engine comprising:

a plurality of mesh screens formed of tubes that form at least a portion of a fluidly conductive circuit that includes a compressor section of the engine, the mesh screens, and an air intake portion of the engine, wherein the mesh screens include a first tier and a second tier in thermal communication with the first tier, the first tier stacked in a direction perpendicular to the flow of fluid traveling through the plurality of tubes on the second tier with at least a portion of the tubes being arranged in the first tier and solid wire links being positioned in the second tier.

14. The engine according to claim 13 wherein the plurality of mesh screens are arranged in an array such that each screen is positioned over an associated air intake.

15. The engine according to claim 14 wherein each of the mesh screens are fluidly connected with the compressor section of the engine via a bleed line.

16. The engine according to claim 15, wherein each of the mesh screens are fluidly connected to a manifold which is fluidly connected via a single bleed line to the compressor section of the engine.

* * * * *